(12) United States Patent
Yang (10) Patent No.: US 10,990,081 B2
(45) Date of Patent: Apr. 27, 2021

(54) PROCESSING METHOD, PROCESSING APPARATUS, AND ELECTRONIC DEVICE

(71) Applicant: Lenovo (Beijing) Co., Ltd., Beijing (CN)

(72) Inventor: Rui Yang, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 171 days.

(21) Appl. No.: 16/238,332

(22) Filed: Jan. 2, 2019

(65) Prior Publication Data

US 2019/0207340 A1   Jul. 4, 2019

(30) Foreign Application Priority Data

Jan. 2, 2018   (CN) .......................... 201810001472.7

(51) Int. Cl.
| | | |
|---|---|---|
| *G06F 13/38* | (2006.01) | |
| *G06F 3/16* | (2006.01) | |
| *G05B 19/414* | (2006.01) | |
| *G06F 9/30* | (2018.01) | |
| *G06F 13/10* | (2006.01) | |

(52) U.S. Cl.
CPC ....... *G05B 19/414* (2013.01); *G06F 9/30003* (2013.01); *G06F 13/385* (2013.01); *G06F 3/162* (2013.01); *G06F 13/102* (2013.01)

(58) Field of Classification Search
CPC ....... G06F 13/385; G06F 13/102; G06F 3/162
See application file for complete search history.

(56) References Cited

U.S. PATENT DOCUMENTS

| | | | | |
|---|---|---|---|---|
| 2007/0260763 | A1* | 11/2007 | Kasama | G06F 9/4415 710/8 |
| 2015/0304769 | A1* | 10/2015 | Weijand | H04R 29/001 381/123 |
| 2016/0154048 | A1* | 6/2016 | Lee | G01R 31/66 324/538 |
| 2017/0262035 | A1 | 9/2017 | Agarwal et al. | |
| 2018/0027330 | A1* | 1/2018 | Rand | H01R 29/00 381/309 |
| 2018/0060261 | A1* | 3/2018 | Chhor | G06F 13/4282 |
| 2018/0181509 | A1* | 6/2018 | Jo | G06F 13/4282 |
| 2019/0294228 | A1* | 9/2019 | Tamura | G06F 1/26 |

FOREIGN PATENT DOCUMENTS

| | | |
|---|---|---|
| CN | 101493799 A | 7/2009 |
| CN | 102542192 A | 7/2012 |
| CN | 103164355 A | 6/2013 |
| CN | 104679588 A | 6/2015 |
| CN | 105630595 A | 6/2016 |

* cited by examiner

*Primary Examiner* — Zachary K Huson
(74) *Attorney, Agent, or Firm* — Anova Law Group, PLLC (57) ABSTRACT

The present disclosure provides a processing method, a processing apparatus, and an electronic device. The method includes identifying a connection relationship, from two or more candidate connection relationships, that matches a plug connect between a first port of an external device and a second port of an electronic device, in response to detecting a plug connect between the first port and the second port; based on the connection relationship, identifying a control command corresponding to the connection relationship, each candidate connection relationship corresponding to a different control command; and responding to the control command.

17 Claims, 4 Drawing Sheets

---

Identify a connection relationship, from two of more candidate connection relationships, that matches a plug connect between a first port of an external device and a second port of an electronic device, in response to detecting a plug connect between the first port and the second port — S11

↓

Based on the connection relationship, identify a control command corresponding to the connection relationship, wherein each candidate connection relationship corresponds to a different control command — S12

↓

Respond to the control command — S13

PROCESSING METHOD, PROCESSING APPARATUS, AND ELECTRONIC DEVICE

CROSS-REFERENCES TO RELATED APPLICATIONS

This application claims the priority to Chinese Patent Application No. 201810001472.7, entitled "Processing Method and Apparatus, and an Electronic Device thereof," filed on Jan. 2, 2018, the entire content of which is incorporated herein by reference.

FIELD OF TECHNOLOGY

The present disclosure relates to the field of control, and more specifically, relates to a processing method, a processing apparatus, and an electronic device.

BACKGROUND

Currently, additional software controls are needed to expand the functionalities of devices connected to an electronic device through connection ports. However, these additional software controls may increase the complexity of user operation, hence lower the user experience.

BRIEF SUMMARY OF THE DISCLOSURE

One aspect of the present disclosure provides a processing method, including: identifying a connection relationship, from two or more candidate connection relationships, that matches a plug connect between a first port of an external device and a second port of an electronic device, in response to detecting a plug connect between the first port and the second port; based on the connection relationship, identifying a control command corresponding to the connection relationship, each candidate connection relationship corresponding to a different control command; and responding to the control command.

Another aspect of the present disclosure provides an electronic device. The electronic device includes an electronic device port capable of connecting to a first port on an external device and a processor. The processor is configured to identify a connection relationship, from two or more candidate connection relationships, that matches a plug connect between the first port and the electronic device port, in response to detecting a plug connect between the first port and the second port, identify a control command corresponding to the connection relationship, each candidate connection relationship corresponding to a different control command; and respond to the control command.

Another aspect of the present invention provides a processing apparatus. The processing apparatus includes at least one processor, configured to: identify a connection relationship, from two or more candidate connection relationships, that matches a plug connect between the first port and the electronic device port, in response to detecting a plug connect between the first port and the second port, identify a control command corresponding to the connection relationship, each candidate connection relationship corresponding to a different control command; and respond to the control command.

Other aspects of the present disclosure can be understood by those skilled in the art in light of the description, the claims, and the drawings of the present disclosure.

BRIEF DESCRIPTION OF THE DRAWINGS

For a more complete understanding of the present disclosure, and the advantages thereof, reference is now made to the following descriptions to be taken in conjunction with the accompanying drawings. The accompanying drawings in the following description show merely some embodiments of the present invention, and a person of ordinary skill in the art may still derive other drawings from these accompanying drawings without creative efforts.

DETAILED DESCRIPTION

Hereinafter, aspects, features, and embodiments of the present disclosure will be described with reference to the accompanying drawings. It should be understood that such description is exemplary only but is not intended to limit the scope of the present disclosure. In addition, it will be understood by those skilled in the art that various modifications in form and details may be made therein without departing from the spirit and scope of the present disclosure.

The accompanying drawings illustrating embodiments of the present disclosure along with the summary of disclosure provided above and the detailed description provided below serve to explain the concepts of the present disclosure.

Features and aspects of the present disclosure will become apparent with reference to the accompanying drawings and non-limiting examples describing various preferred embodiments of the present disclosure.

It will also be appreciated that although the present disclosure has been described with reference to some specific examples, equivalents of the present disclosure can be achieved by those skilled in the art. These equivalents having features claimed in the present disclosure should fall within the scope of protection defined hereinafter.

Hereinafter, embodiments of the present disclosure will be described with reference to the accompanying drawings. It should be understood that such description is exemplary only but is not intended to limit the scope of the present disclosure. In addition, in the following description, descriptions of well-known structures and techniques are omitted to avoid unnecessarily obscuring the concepts of the present disclosure. Therefore, specific structural and functional details disclosed herein are not intended to be limiting, but are merely used as a basis of the claims to teach those skilled in the art to use the present disclosure in various combinations.

The terms used herein is for the purpose of describing particular embodiments only but is not intended to limit the present disclosure. The words "a", "an" and "the" as used herein should also cover the meanings of "a plurality of" and "a variety of", unless the context clearly dictates otherwise. In addition, the terms "comprising", "including", "containing" and the like as used herein indicate the presence of the features, steps, operations and/or components, but do not preclude the presence or addition of one or more other features, steps, operations or components.

The phrases "in an embodiment", "in another embodiment", "in another embodiment", or "in other embodiments" may refer to the same or different embodiments accordingly to the present disclosure.

Embodiments of the present disclosure provide a processing method, a processing apparatus, and an electronic device, which can solve the problems of complicated user operation and poor user experience due to introducing of additional software controls to expand the functionalities of devices connected to an electronic device through connection ports.

In one embodiment, the method includes identifying a connection relationship, from two or more candidate connection relationships, that matches a plug connect between a first port of an external device and a second port of an electronic device, in response to detecting a plug connect between the first port and the second port; based on the connection relationship, identifying a control command corresponding to the connection relationship, each candidate connection relationship corresponding to a different control command; and responding to the control command. The identification of connection relationship between the external device and the electronic device, and the control commands corresponding to the connection relationship avoids the need of additional software controls to enhance the functionalities of the external device, thereby simplifying the user operation and enhancing user experience of the external device or the electronic device under various working modes.

Figure 1:
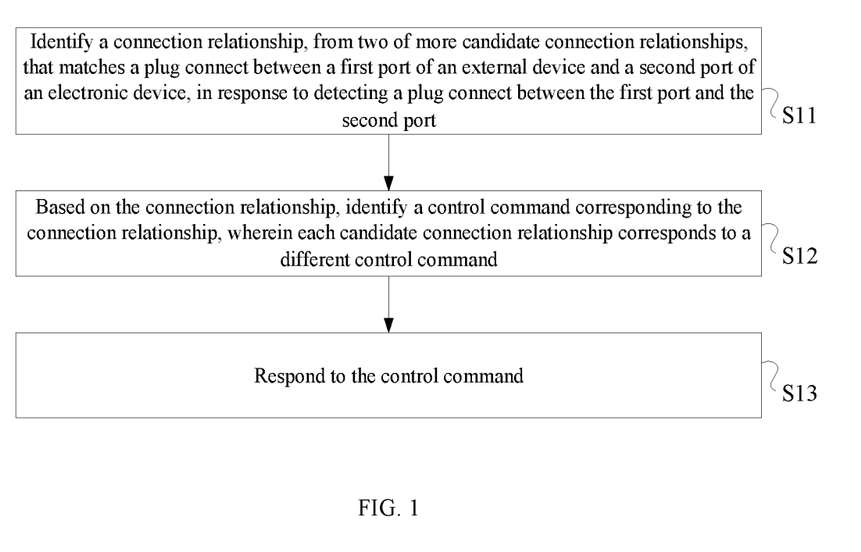
FIG. 1 is a flowchart illustrating a processing method according to an embodiment of the present disclosure.

FIG. 1 is a flowchart illustrating a processing method according to an embodiment of the present disclosure. The method includes the following steps.

In S11, identifying a connection relationship, from two or more candidate connection relationships, that matches a plug connect between a first port of an external device and a second port of an electronic device, in response to detecting a plug connect between the first port and the second port.

The electronic device may include a second port, and the external device may include a first port. The first port may be a plug, and the electronic device may be connected to the first port of the external device through the second port so the electronic device and the external device may be connected. Further, the first port and the second port may have two or more connection relationships.

Two or more potential connection relationships between the first port and the second port may be pre-stored as the candidate connection relationships. The candidate connection relationships may be used to identify the current connection relationship from the two or more candidate connection relationships in response to detecting the plug connect between the first port and the second port.

The first port and the second port may be connected in two or more candidate connection relationships. The two or more candidate connection relationships may be a plurality of connection parameters used to identify the connection relationship. The connection parameters may indicate the depth, angle, or position of the plug connect between the first port and the second port.

When the connection parameters indicate the depth of plug connect between the first port and the second port, different connection parameters may indicate different depths of connection relationships. For example, when the first port is fully connected to the second port, it may be indicated as the first connection parameter. For example, the first port may be a plug, and the first port may be fully inserted into the second port, at this point, the connection relationship corresponds to the first connection parameter may be the first candidate connection relationship. That is, the first port and the second port may be in the first candidate connection relationship. When the first port is not fully connected to the second port, it may be indicated as the second connection parameter. For example, the first port may be a plug, and the first port may not be fully inserted into the second port, such as when the first port is half-inserted into the second port. At this point, the connection relationship corresponds to the second connection parameter may be the second candidate connection relationship. That is, the first port and the second port may be in the second candidate connection relationship.

When the connection parameters indicate the angle of the plug connect between the first port and the second port, different connection parameters may indicate different angles of connection relationships. For example, take a predetermined side of the first port from a first end to a second end as a first reference direction, and a predetermined side of the second port from a first end to a second end as a second reference direction. When the angle between the first reference direction and the second reference direction is 0°, the connection relationship between the first port and the second may be the first candidate connection relationship. When the angle between the first reference direction and the second reference direction is 180°, the connection relationship between the first port and the second may be the second candidate connection relationship. For example, the first port may be a Type C plug, the second port may be a Type C port, and the first port may be connected through two or more angles. That is, the first surface of the first port and the second surface of the second port may have two or more angles, such as forward insertion and reverse insertion.

The plug connect between the first port and the second port in different positions may indicate different connection relationships, and connection identifiers may be used to indicate the connection relationship where connection identifiers in different positions may indicate different connection relationships. The second port may be connected to the first port in a finite number of relative locations. Identify the relative location of the plug connect between the first port and the second port may identify the connection relationship corresponding relative location of the connection of the two or more candidate connection relationships.

For example, the first port may be a plug, the second port may be a slot, and the second port may be connected to the first port in a finite number of relative locations. Because the plug and slot of the existing universal 3.5 mm earphone may be rotated at any angle, the relative location is infinite. Due to the infinite number of angles or positions, the user cannot accurately insert the plug at a specified angle or position. Therefore, the preferred port is a port with a finite number of insertion positions.

On the basis of this understanding, the first port may be a Type A plug and the second port may be an unconventional Type A slot. The first port may be inserted into the second port through forward and reverse insertion. That is, the second port may be connected to the first port in two different relative locations. The first port may also be a micro USB plug, and the second port may be an unconventional micro USB slot. The first port may be inserted into the second port through forward and reverse insertion. Further, the first port may also be a Type C plug, and the second portion may be a Type C slot, and the second port may be bi-directionally connected to first port. Furthermore, the first port may be a Lightening plug, the second port may be a Lightening slot, and the second port may be bi-directionally connected to first port.

In one embodiment, the first port and the second port may be connected in two or more connection relationships, and different connection relationships may correspond to different control commands. The two or more connection relationships may correspond to two or more control commands; thereby avoid using software control to expand the functionalities of the external device.

For example, different connection surfaces may be distinguished by different signs on the plug of the external device. For example, the first port of the external device may be a Type C plug. One surface of the Type C plug may be coated red and the other surface may be coated blue to help user distinguish different connection relationships between the first port and the second port.

In S12, based on the connection relationship, identifying a control command corresponding to the connection relationship, wherein each candidate connection relationship corresponds to a different control command.

In S13, responding to the control command.

The first port and the second port may be connected in two or more candidate connection relationships, and different candidate connection relationships may correspond to different control commands. That is, the first port and the second port may be connected in a first connection relationship which corresponds to a first control command, or the first port and the second port may be connected in a second connection relationship which corresponds to a second control command.

For example, when the connection relationship is identified to be the first connection relationship in the two or more candidate connection relationships, identify the first control command, where the first control command may place the electronic device or the external device under a first working mode. Further, when the connection relationship is identified to be the second connection relationship in the two or more candidate connection relationships, identify the second control command, where the second control command may place the electronic device or the external device under a second working mode.

In one embodiment, every connection relationship may correspond to a different control command. When the connection relationship between the first port and the second port is the first connection relationship in the two or more connection relationships, identify the first control command based on the first connection relationship. When the connection relationship between the first port and the second port is the first connection relationship, the process may indicate the first control command that need to be executed corresponding to the first connection relationship, respond to the first control command, and place the electronic device or the external device under the first working mode. When the connection relationship between the first port and the second port is the second connection relationship, the process may indicate the second control command that need to be executed corresponding to the second connection relationship, respond to the second control command, and place the electronic device or the external device under the second working mode.

In one embodiment, working modes may be the working modes of the electronic device, the working modes of the external device, or the working modes of both the electronic device and the external device.

In one embodiment, working modes may include power consumption modes, output modes, and may also include function modes.

For example, the first control command may place the electronic device under a first power consumption mode, and the second control command may place the electronic device under a second power consumption mode; the first control command may place the electronic device under a first output mode, and the second control command may place the electronic device under a second output mode; and the first control command may place the electronic device under a first function mode, and the second control command may place the electronic device under a second function mode.

Further, the first control command may place the external device under a first power consumption mode, and the second control command may place the external device under a second power consumption mode; the first control command may place the external device under a first output mode, and the second control command may place the external device under a second output mode; and the first control command may place the external device under a first function mode, and the second control command may place the external device under a second function mode.

Furthermore, the first control command may place both the electronic device and the external device under a first power consumption mode, and the second control command may place both the electronic device and the external device under a second power consumption mode; the first control command may place both the electronic device and the external device under a first output mode, and the second control command may place both the electronic device and the external device under a second output mode; and the first control command may place both the electronic device and the external device under a first function mode, and the second control command may place both the electronic device and the external device under a second function mode.

The electronic device's working mode may be the power consumption mode, and the first port and the second port may be connected in the first candidate connection relationship. A power consumption device may switch from the first working mode to the second working mode after a first time period. Further, the first port and the second port may be connected in the second candidate connection relationship. The power consumption device may switch from the first working mode to the second working mode after a second time period. The power consumption in the first working mode may be greater than the power consumption in the second working mode, and the first time period may be longer than the second time period.

For example, the power consumption device may be a monitor, and the external device may be a headset. The headset may connect to the electronic through forward insertion, the monitor of the electronic device may stay lit for the first 2 minutes, then monitor may shut off after 2 minutes. That is, the first port and the second port may be connected in the first candidate connection relationship for 2 minutes, and the electronic device may switch from the first working mode to the second working mode. The headset may connect to the electronic through reverse insertion, and the monitor of the electronic device may shut off immediately. That is, the first port and the second port may be connected in the second candidate connection relationship, and the electronic device may directly switch to the second working mode. Compared with the first candidate connection relationship, the electronic device connected to the headset in the second candidate connection relationship may reduce the power consumption of the monitor.

The external device's working mode may be the power consumption mode, the first port and the second port may be connected in the first candidate connection relationship, and the external device may be placed under a first power consumption mode. Further, the first port and the second port may be connected in the second candidate connection relationship, and the external device may be placed under a second power consumption mode. Furthermore, the power consumption in the first power consumption mode may be greater than the second power consumption mode.

For example, the external device may be a mobile power source, the first port may be a plug, and the second port may be a slot. When plug is fully inserted into the slot, the mobile power source may fast charge the electronic device, that is, the external device may be placed under the first power consumption mode. Further, when the plug is not fully inserted into the slot, for example, the plugs may be half-inserted or inserted 2/3 into the slot, the mobile power source may slow charge the electronic device, that is, the external device may be placed under the second power consumption mode.

The electronic device's working mode may be the function mode, the first port and the second port may be connected in the first candidate connection relationship, and the electronic device may be under a first function mode. Further, the first port and the second port may be connected in the second candidate connection relationship, and the electronic device may be under a second function mode.

For example, the external device may be a data cable, and the electronic device may be a mobile phone. When the first port is connected to the second port through forward insertion, the external device may charge the electronic device and maintain the brightness of the monitor of the electronic device. When the first port is connected to the second port through reverse insertion, the external may transmit data to the electronic device and the monitor of the electronic device may shut off.

The electronic device and the external device's working mode may be the power consumption mode, the first port and the second port may be connected in the first candidate connection relationship, and the electronic device and the external device may be under a first power consumption mode simultaneously. Further, the first port and the second port may be connected in the second candidate connection relationship, and the electronic device and the external device and may be under a second power consumption mode simultaneously. Furthermore, the power consumption in the first power consumption mode may be greater than the second power consumption mode.

For example, the external device may be a headset. When the first port is connected to a first second-port, the monitor of the electronic device may be in the high brightness mode, and the headset may be in the high volume mode. When the first port is connected to a second second-port, the monitor of the electronic device may be in the low brightness mode, and the headset may be in the low volume mode.

The working modes may be the output modes.

In one embodiment, the external device may be a multimedia output device, the first working mode may be the external device's first output mode, and the second working mode may be external device's second output mode.

In one embodiment, the multimedia output device may be a headset or a display. When the external device is a headset, its working modes may include a first audio output mode, a second audio output mode, etc. The first audio output mode may be an audio output mode that meets a first audio output condition where the first audio output condition may be the surrounding sound less than 30 decibels, that is, the surrounding may be in a quite state, the audio output mode may be a mode that corresponds to the first audio output condition, such as a low volume mode. Further, the first audio output condition may be a condition where the audio transmitted corresponds to the audio output of the external device, which may be soothing or intense. Further, the first audio output condition may be a output mode that strengthens the midrange and reduces the treble and bass, and a second audio output condition may be a output mode that strengthens the treble and lower the midrange and bass. For example, when making a call using the headset, the first audio output mode may be used to enhance the frequency band in which the user is speaking and reduce the sound of other frequency bands; when using the headset to listen to music, the second audio output mode may be used to enhance the high-pitched music the user often listen to and reduce the bass and midrange music the user may not often listen to.

In one embodiment, the external device may be a display, and its working modes may include a first image output mode, a second image output mode, etc. The first image output mode may be a color image output mode, such as when output a video or a picture. The second image output mode may be a black and white image output mode, such as when output a text document or an electronic book. Alternatively, the image output mode may be a mode that transmits images corresponding to the ambient lights or brightness of the context of images being transmitted, such as when playing a horror movie, the first image output mode may be used to transmit darker images.

In one embodiment, the external device may be a multimedia acquisition device, the first working mode may be a first acquisition mode, and the second working mode may be a second acquisition mode.

In one embodiment, the multimedia device may be a microphone or an image acquisition device. The external device may be a microphone, and its working modes may include a first audio acquisition mode, a second audio acquisition mode, etc. For example, the first audio acquisition mode may be a noise reduction acquisition mode, and the second audio acquisition mode may be a non-noise reduction acquisition mode.

In one embodiment, the external device may be an image acquisition device and its working modes may include a first image acquisition mode, a second image acquisition mode, etc. For example, the first image acquisition mode may be a high saturation acquisition mode, the second image acquisition mode may be a low saturation acquisition mode, etc.

In one embodiment, the external device may be a headset, which may be a device with a microphone and an earphone, and its working mode, and its working modes may include a first working mode for voice sound effect with noise reduction, and a second working mode for musical sound effect without noise reduction.

In one embodiment, the external device may be a storage device, the electronic device's first working mode may be a mode with a first read access, and its second working mode may be a mode with a second read access. For example, the first working mode may be a working mode that allows the external device to access all data, and the second working mode may be a working mode that allows the external device to access partial non-critical data. The electronic device may further include a third working mode where the third working mode a working mode that does not allow the external device to access any data. For example, the first port may need to be inserted into 3 second ports in a predetermined sequence to prevent unauthorized users from stealing data from electronic devices.

Further, the external device's first working mode may be a working mode that allows the electronic device to access data in the external device, and the second working mode may be a working mode that does not allow the electronic device to access data in the external device. The electronic device may only access data in the external device when the first port and the second port are connected in the first connection relationship to prevent illegal access of data from the external device.

In one embodiment, the external device may be a storage device, the electronic device's first working mode may be a mode with a first write access, and its second working mode may be a mode with a second write access. For example, the first working mode may be a working mode that allows the external device to write data, and the second working mode may be a working mode that does not allow the external device to write data. The external device may only write data into the electronic device when the first port and the second port are connected in the first connection relationship to prevent the electronic device when from virus attacks.

In one embodiment, the external device's first working mode may be a working mode that allows the electronic device to write data into the external device, and its second working mode may be a working mode that does not allow the electronic device to write data into the external device. The electronic device may only write data into the external device when the first port and the second port are connected in the first connection relationship to prevent the external device when from virus attacks.

In one embodiment, when the electronic device or external device is under the second working mode and the connection relationship matches the first connection relationship, upon receiving a second mode switch instruction to switch the electronic device or external device from the second working mode to the first working mode, the electronic device or the external device may respond to the second mode switch instruction. Further, when the electronic device or external device is under the first working mode and the connection relationship matches the second connection relationship, upon receiving a first mode switch instruction to switch the external device or electronic device from the first working mode to the second working mode, the electronic device or the external device may respond to the second mode switch instruction.

That is, when the electronic device or the external device is under the second working mode, the connection relationship of the electronic device or the external device may switch from the second connection relationship to the first connection relationship, and the electronic device or the external may switch from the second working mode to the first working mode based on the second mode switch instruction. Further, when the electronic device or the external device is under the first working mode, the connection relationship of the electronic device or the external device may switch from the first connection relationship to the second connection relationship, and the electronic device or the external may switch from the first working mode to the second working mode based on the first mode switch instruction.

In one embodiment, upon receiving a first mode switch instruction to switch the external device or electronic device from the first working mode to the second working mode, and the connection relationship matches the first connection relationship, the electronic device or the external device may respond to the first mode switch instruction. Further, upon receiving a second mode switch instruction to switch the external device or electronic device from the second working mode to the first working mode, and the connection relationship matches the second connection relationship, the electronic device or the external device may respond to the second mode switch instruction.

For example, the external device may be a display device, the first connection relationship may correspond to a first image output mode, and the second connection relationship may correspond to a second image output mode. While the external device and the electronic device are under the first connection relationship, video files may be transmitted through the external device and the electronic device. Upon the completion of the output of the video files, when text files need to be transmitted, the second mode switch instruction may be used to switch the working mode. Further, while the external device and the electronic device are under the second connection relationship, text files may be transmitted through the external device and the electronic device. Upon the completion of the output of the text files, when video files need to be transmitted, the first mode switch instruction may be used to switch the working mode.

In one embodiment, while the connection relationship is the first connection relationship, and the first port and the second port are connected in the first connection relationship, when a first request is received to place the electronic device or the external device under the first working mode with adjusted parameters, the parameters in the first working mode may be adjusted based on the first request. Upon completing the data output corresponding to the first request, the parameters adjusted under the first working mode may be adjusted to the original parameters.

In one embodiment, the electronic device or the external device may respond to a first command that may be identified based on the first connection relationship when the first port and the second port are connected in the first connection relationship. When the first port and second are in connection relationships other than the first connection relationship, the connection relationships other than the first connection relationship may correspond to invalid control commands or have no corresponding control commands, the connection relationships other than the first connection relationship may be invalid connections, and do not need to be responded.

The embodiments of the processing method described above may identify a connection relationship from two or more candidate connection relationships between a first port of an external device and a second port of an electronic device in response to detecting a plug connect between the first port and the second port; identify a plurality of control commands corresponding to the connection relationship; and respond to the control commands. The identification of connection relationship between the external device and the electronic device, and the control commands corresponding to the connection relationship avoids the need of additional software controls to enhance the functionalities of the external device, thereby simplifying the user operation and enhancing user experience of the external device or the electronic device under various working modes.

Figure 2:
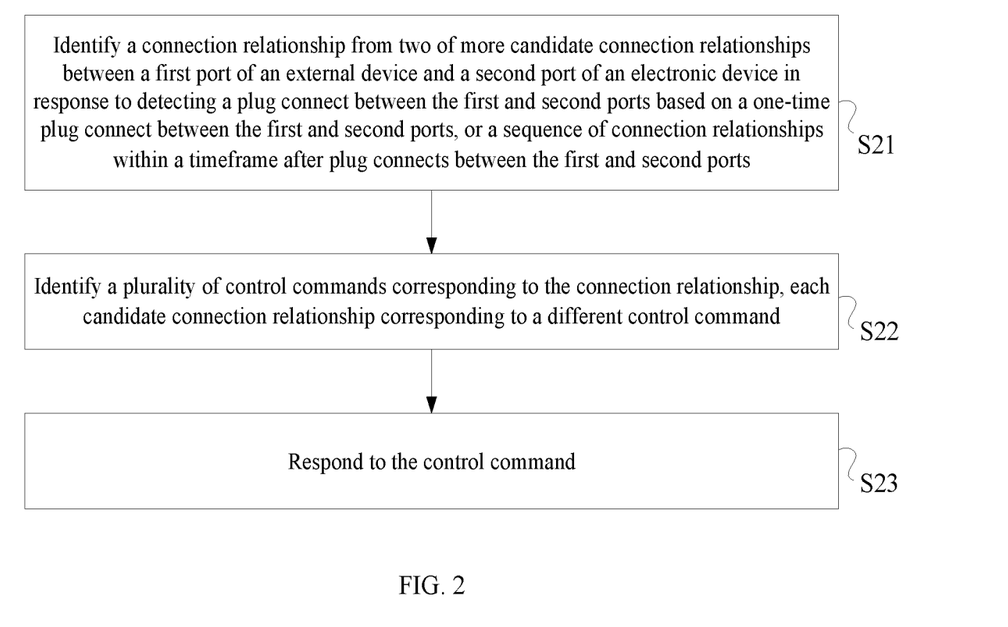
FIG. 2 is a flowchart illustrating a processing method according to another embodiment of the present disclosure.

FIG. 2 is a flowchart illustrating a processing method according to another embodiment of the present disclosure. The method includes the following steps.

In S21, identifying a connection relationship from two or more candidate connection relationships between a first port of an external device and a second port of an electronic device in response to detecting a plug connect between the first port and the second port may be based on a one-time plug connect between the first port and the second port, or a sequence of a plurality of connections within a timeframe between the first port and the second port.

In one embodiment, the two or more candidate connection relationships may include a one-time plug connect between the first port and the second port. For example, the first port and the second port only need to connect once to establish the connection relationship, and the working mode may be identified based on the established connection relationship.

In one embodiment, the two or more candidate connection relationships may include a sequence of connection relationships obtained from a plurality of connections within a timeframe between the first port and the second port. For example, the first port and the second port may connect two or more times within a timeframe, the first connect may be a first connection relationship, the second connect may be a second connection relationship, the third connect may be a third connection relationship, and no more subsequent change in connection relationship afterward. Accordingly, the connection sequence obtained may be the first connection relationship the second connection relationship the first connection relationship. Different connection sequences may correspond to different control commands; hence correspond to different working modes.

In one embodiment, the plurality of connections within a timeframe may be completing all the connections within the timeframe. Further, identification of the connection relationship sequence may be based on a time interval between 2 connections. When the connection relationship does not change in the time interval, the sequence may be considered complete.

Furthermore, the plurality of connections within a timeframe may be that the first port and the second port need to complete two or more connections within the timeframe in sequence. For example, the second port may include a first second-port, a second second-port, and a third second-port. The first port may connect to the first, second, and third second-port, and connect to the last second port within the timeframe to correspond to a first working mode.

In S22, identifying a plurality of control commands corresponding to the connection relationship based on the connection relationship, where each candidate connection relationship corresponds to different control commands.

In S33, responding to the control commands.

The embodiments of the processing method described above may identify a connection relationship from two or more candidate connection relationships between a first port of an external device and a second port of an electronic device in response to detecting a plug connect between the first port and the second port; identify a plurality of control commands corresponding to the connection relationship; and respond to the control commands. The identification of connection relationship between the external device and the electronic device, and the control commands corresponding to the connection relationship avoids the need of additional software controls to enhance the functionalities of the external device, thereby simplifying the user operation and enhancing user experience of the external device or the electronic device under various working modes.

Figure 3:
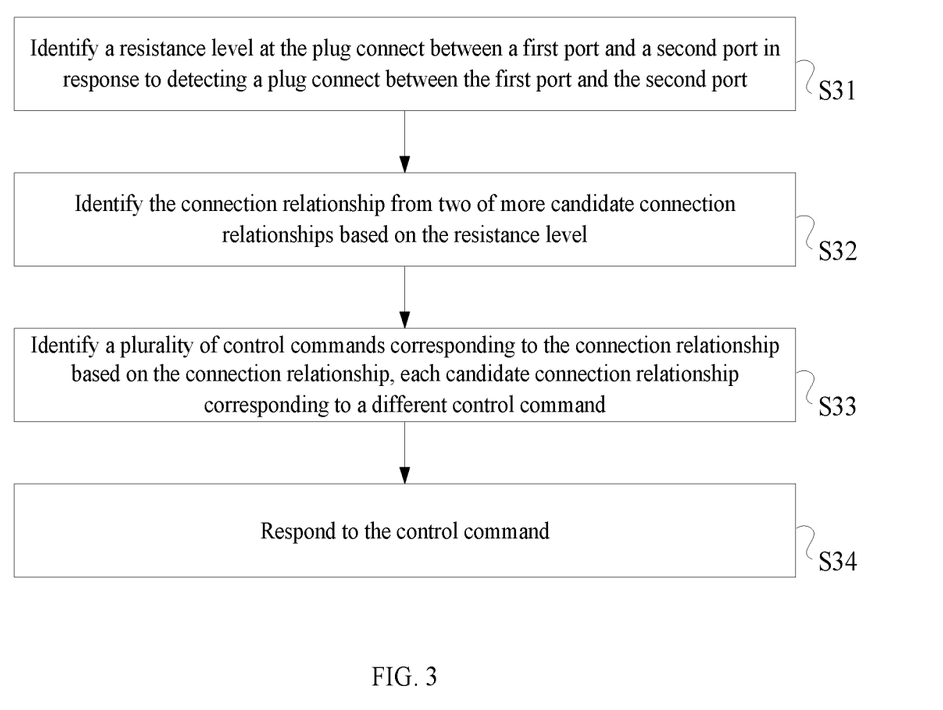
FIG. 3 is a flowchart illustrating a processing method according to yet another embodiment of the present disclosure.

FIG. 3 is a flowchart illustrating a processing method according to yet another embodiment of the present disclosure. The method includes the following exemplary steps.

In S31, identifying a resistance level at the plug connect between a first port and a second port in response to detecting a plug connect between the first port and the second port.

In S32, identifying the connection relationship from two or more candidate connection relationships based on the resistance level.

In one embodiment, the connection relationship may be identified by the connection parameters. The connection parameters may be the resistance level at the plug connect between the first port and the second port, the voltage at the plug connect between the first port and the second port, or sensors detected parameters, etc. In this embodiment, the resistance level at plug connect between the first port and the second port is selected as the connection parameters for further illustration.

The first port and the second port may have two or more candidate connection relationships, and different candidate connection relationships may be identified based on the resistance level at the plug connect between the first port and the second port. That is, the corresponding candidate connection relationship may be identified based on different resistance levels at the plug connect between the first port and the second port that may be connected at different angles or different depths.

For example, the first port may be a Type C plug, the second port may be a Type C slot, and the resistance level at the plug connect between the first port and the second port may be different depending on whether the connection is achieved through forward insertion or reverse insertion.

Further, the connection relationship may be identified from two or more candidate connection relationships based on the relative location of the plug connect between the first port and the second port. Different relative connection positions may correspond to different connection relationships, hence, different control commands.

For example, a plurality of sensors may be placed by the connection of the second port, and data from different number of sensors may correspond to different connection relationships, or data from the plurality of sensors in different positions may correspond to different connection relationships.

In S33, identifying a plurality of control commands corresponding to the connection relationship based on the connection relationship, where each candidate connection relationship corresponds to different control commands.

In S34, responding to the control commands.

The embodiments of the processing method described above may identify a connection relationship from two or more candidate connection relationships between a first port of an external device and a second port of an electronic device in response to detecting a plug connect between the first port and the second port; identify a plurality of control commands corresponding to the connection relationship; and respond to the control commands. The identification of connection relationship between the external device and the electronic device, and the control commands corresponding to the connection relationship avoids the need of additional software controls to enhance the functionalities of the external device, thereby simplifying the user operation and enhancing user experience of the external device or the electronic device under various working modes.

Figure 4:
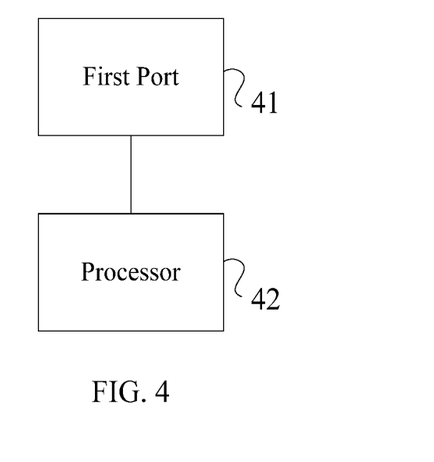
FIG. 4 is a block diagram illustrating the structure of an electronic device an embodiment of the present disclosure.

FIG. 4 is a block diagram illustrating the structure of an electronic device an embodiment of the present disclosure. The electronic device includes a second port 41 and a processor 42. The second port 41 may be used to connect to a first port of an external device. Processor 42 may identify a connection relationship from two or more candidate connection relationships between the first port and the second port in response to detecting a plug connect between the first port and the second port. Processor 42 may also identify a plurality of control commands corresponding to the connection relationship based on the connection relationship, and respond to the control commands. Further, each candidate connection relationship corresponds to a different control command.

The electronic device may include a second port, and the external device may include a first port. The first port may be a plug, and the electronic device may be connected to the first port of the external device through the second port so the electronic device and the external device may be connected with one another. Further, the first port and the second port may have two or more connection relationships.

Two or more potential connection relationships between the first port and the second port may be pre-stored as the two or more candidate connection relationships. The candidate connection relationships may be used to identify the current connection relationship from the two or more candidate connection relationships in response to detecting the plug connect between the first port and the second port.

The first port and the second port may be connected in two or more candidate connection relationships. The two or more candidate connection relationships may be a plurality of connection parameters used to identify the connection relationship. The connection parameters may indicate the depth, angle, or position of the plug connect between the first port and the second port.

When the connection parameters indicate the depth of plug connect between the first port and the second port, different connection parameters may indicate different depths of connection relationships. For example, when the first port is fully connected to the second port, it may be indicated as the first connection parameter. For example, the first port may be a plug, and the first port may be fully inserted into the second port, at this point, the connection relationship corresponds to the first connection parameter may be the first candidate connection relationship. That is, the first port and the second port may be in the first candidate connection relationship. When the first port is not fully connected to the second port, it may be indicated as the second connection parameter. For example, the first port may be a plug, and the first port may not be fully inserted into the second port, such as when the first port is half-inserted into the second port. At this point, the connection relationship corresponds to the second connection parameter may be the second candidate connection relationship. That is, the first port and the second port may be in the second candidate connection relationship.

When the connection parameters indicate the angle of the plug connect between the first port and the second port, different connection parameters may indicate different angles of connection relationships. For example, take a predetermined side of the first port from a first end to a second end as a first reference direction, and a predetermined side of the second port from a first end to a second end as a second reference direction. When the angle between the first reference direction and the second reference direction is 0°, the connection relationship between the first port and the second may be the first candidate connection relationship. When the angle between the first reference direction and the second reference direction is 180°, the connection relationship between the first port and the second may be the second candidate connection relationship. For example, the first port may be a Type C plug, the second port may be a Type C port, and the first port may be connected through two or more angles. That is, the first surface of the first port and the second surface of the second port may have two or more angles, such as forward insertion and reverse insertion.

The plug connect between the first port and the second port in different positions may indicate different connection relationships, and connection identifiers may be used to indicate the connection relationship where connection identifiers in different positions may indicate different connection relationships. The second port may be connected to the first port in a finite number of relative locations. Identify the relative location of the plug connect between the first port and the second port may identify the connection relationship corresponding relative location of the connection of the two or more candidate connection relationships.

For example, the first port may be a plug, the second port may be a slot, and the second port may be connected to the first port in a finite number of relative locations. Because the plug and slot of the existing universal 3.5 mm earphone may be rotated at any angle, the relative location is infinite. Due to the infinite number of angles or positions, the user cannot accurately insert the plug at a specified angle or position. Therefore, the preferred port is a port with a finite number of insertion positions.

On the basis of this understanding, the first port may be a Type A plug and the second port may be an unconventional Type A slot. The first port may be inserted into the second port through forward and reverse insertion. That is, the second port may be connected to the first port in two different relative locations. The first port may also be a micro USB plug, and the second port may be an unconventional micro USB slot. The first port may be inserted into the second port through forward and reverse insertion. Further, the first port may also be a Type C plug, and the second portion may be a Type C slot, and the second port may be bi-directionally connected to first port. Furthermore, the first port may be a Lightening plug, the second port may be a Lightening slot, and the second port may be bi-directionally connected to first port.

In one embodiment, the first port and the second port may be connected in two or more connection relationships, and different connection relationships may correspond to different control commands. The two or more connection relationships may correspond to two or more control commands; thereby avoid using software control to expand the functionalities of the external device.

For example, different connection surfaces may be distinguished by different signs on the plug of the external device. For example, the first port of the external device may be a Type C plug. One surface of the Type C plug may be coated red and the other surface may be coated blue to help user distinguish different connection relationships between the first port and the second port.

The first port and the second port may be connected in two or more candidate connection relationships, and different candidate connection relationships may correspond to different control commands. That is, the first port and the second port may be connected in a first connection relationship which corresponds to a first control command, or the first port and the second port may be connected in a second connection relationship which corresponds to a second control command.

For example, when the connection relationship is identified to be the first connection relationship in the two or more candidate connection relationships, identify the first control command, where the first control command may place the electronic device or the external device under a first working mode. Further, when the connection relationship is identified to be the second connection relationship in the two or more candidate connection relationships, identify the second control command, where the second control command may place the electronic device or the external device under a second working mode.

In one embodiment, every connection relationship may correspond to a different control command. When the connection relationship between the first port and the second port is the first connection relationship in the two or more connection relationships, identify the first control command based on the first connection relationship. When the connection relationship between the first port and the second port is the first connection relationship, the process may indicate the first control command that need to be executed corresponding to the first connection relationship, respond to the first control command, and place the electronic device or the external device under the first working mode. When the connection relationship between the first port and the second port is the second connection relationship, the process may indicate the second control command that need to be executed corresponding to the second connection relationship, respond to the second control command, and place the electronic device or the external device under the second working mode.

In one embodiment, working modes may be the working modes of the electronic device, the working modes of the external device, or the working modes of both the electronic device and the external device.

In one embodiment, working modes may include power consumption modes, output modes, and may also include function modes.

For example, the first control command may place the electronic device under a first power consumption mode, and the second control command may place the electronic device under a second power consumption mode; the first control command may place the electronic device under a first output mode, and the second control command may place the electronic device under a second output mode; and the first control command may place the electronic device under a first function mode, and the second control command may place the electronic device under a second function mode.

Further, the first control command may place the external device under a first power consumption mode, and the second control command may place the external device under a second power consumption mode; the first control command may place the external device under a first output mode, and the second control command may place the external device under a second output mode; and the first control command may place the external device under a first function mode, and the second control command may place the external device under a second function mode.

Furthermore, the first control command may place both the electronic device and the external device under a first power consumption mode, and the second control command may place both the electronic device and the external device under a second power consumption mode; the first control command may place both the electronic device and the external device under a first output mode, and the second control command may place both the electronic device and the external device under a second output mode; and the first control command may place both the electronic device and the external device under a first function mode, and the second control command may place both the electronic device and the external device under a second function mode.

The electronic device's working mode may be the power consumption mode, and the first port and the second port may be connected in the first candidate connection relationship. A power consumption device may switch from the first working mode to the second working mode after a first time period. Further, the first port and the second port may be connected in the second candidate connection relationship. The power consumption device may switch from the first working mode to the second working mode after a second time period. The power consumption in the first working mode may be greater than the power consumption in the second working mode, and the first time period may be longer than the second time period.

For example, the power consumption device may be a monitor, and the external device may be a headset. The headset may connect to the electronic through forward insertion, the monitor of the electronic device may stay lit for the first 2 minutes, then monitor may shut off after 2 minutes. That is, the first port and the second port may be connected in the first candidate connection relationship for 2 minutes, and the electronic device may switch from the first working mode to the second working mode. The headset may connect to the electronic through reverse insertion, and the monitor of the electronic device may shut off immediately. That is, the first port and the second port may be connected in the second candidate connection relationship, and the electronic device may directly switch to the second working mode. Compared with the first candidate connection relationship, the electronic device connected to the headset in the second candidate connection relationship may reduce the power consumption of the monitor.

The external device's working mode may be the power consumption mode, the first port and the second port may be connected in the first candidate connection relationship, and the external device may be placed under a first power consumption mode. Further, the first port and the second port may be connected in the second candidate connection relationship, and the external device may be placed under a second power consumption mode. Furthermore, the power consumption in the first power consumption mode may be greater than the second power consumption mode.

For example, the external device may be a mobile power source, the first port may be a plug, and the second port may be a slot. When plug is fully inserted into the slot, the mobile power source may fast charge the electronic device, that is, the external device may be placed under the first power consumption mode. Further, when the plug is not fully inserted into the slot, for example, the plugs may be half-inserted or inserted 2/3 into the slot, the mobile power source may slow charge the electronic device, that is, the external device may be placed under the second power consumption mode.

The electronic device's working mode may be the function mode, the first port and the second port may be connected in the first candidate connection relationship, and the electronic device may be under a first function mode. Further, the first port and the second port may be connected in the second candidate connection relationship, and the electronic device may be under a second function mode.

For example, the external device may be a data cable, and the electronic device may be a mobile phone. When the first port is connected to the second port through forward insertion, the external device may charge the electronic device and maintain the brightness of the monitor of the electronic device. When the first port is connected to the second port through reverse insertion, the external may transmit data to the electronic device and the monitor of the electronic device may shut off.

The electronic device and the external device's working mode may be the power consumption mode, the first port and the second port may be connected in the first candidate connection relationship, and the electronic device and the external device may be under a first power consumption mode simultaneously. Further, the first port and the second port may be connected in the second candidate connection relationship, and the electronic device and the external device and may be under a second power consumption mode simultaneously. Furthermore, the power consumption in the first power consumption mode may be greater than the second power consumption mode.

For example, the external device may be a headset. When the first port is connected to a first second-port, the monitor of the electronic device may be in the high brightness mode, and the headset may be in the high volume mode. When the first port is connected to a second second-port, the monitor of the electronic device may be in the low brightness mode, and the headset may be in the low volume mode.

The working modes may be the output modes.

In one embodiment, the external device may be a multimedia output device, the first working mode may be the external device's first output mode, and the second working mode may be external device's second output mode.

In one embodiment, the multimedia output device may be a headset or a display. When the external device is a headset, its working modes may include a first audio output mode, a second audio output mode, etc. The first audio output mode may be an audio output mode that meets a first audio output condition where the first audio output condition may be the surrounding sound less than 30 decibels, that is, the surrounding may be in a quite state, the audio output mode may be a mode that corresponds to the first audio output condition, such as a low volume mode. Further, the first audio output condition may be a condition where the audio transmitted corresponds to the audio output of the external device, which may be soothing or intense. Further, the first audio output condition may be a output mode that strengthens the midrange and reduces the treble and bass, and a second audio output condition may be a output mode that strengthens the treble and lower the midrange and bass. For example, when making a call using the headset, the first audio output mode may be used to enhance the frequency band in which the user is speaking and reduce the sound of other frequency bands; when using the headset to listen to music, the second audio output mode may be used to enhance the high-pitched music the user often listen to and reduce the bass and midrange music the user may not often listen to.

In one embodiment, the external device may be a display, and its working modes may include a first image output mode, a second image output mode, etc. The first image output mode may be a color image output mode, such as when output a video or a picture. The second image output mode may be a black and white image output mode, such as when output a text document or an electronic book. Alternatively, the image output mode may be a mode that transmits images corresponding to the ambient lights or brightness of the context of images being transmitted, such as when playing a horror movie, the first image output mode may be used to transmit darker images.

In one embodiment, the external device may be a multimedia acquisition device, the first working mode may be a first acquisition mode, and the second working mode may be a second acquisition mode.

In one embodiment, the multimedia device may be a microphone or an image acquisition device. The external device may be a microphone, and its working modes may include a first audio acquisition mode, a second audio acquisition mode, etc. For example, the first audio acquisition mode may be a noise reduction acquisition mode, and the second audio acquisition mode may be a non-noise reduction acquisition mode.

In one embodiment, the external device may be an image acquisition device and its working modes may include a first image acquisition mode, a second image acquisition mode, etc. For example, the first image acquisition mode may be a high saturation acquisition mode, the second image acquisition mode may be a low saturation acquisition mode, etc.

In one embodiment, the external device may be a headset, which may be a device with a microphone and an earphone, and its working mode, and its working modes may include a first working mode for voice sound effect with noise reduction, and a second working mode for musical sound effect without noise reduction.

In one embodiment, the external device may be a storage device, the electronic device's first working mode may be a mode with a first read access, and its second working mode may be a mode with a second read access. For example, the first working mode may be a working mode that allows the external device to access all data, and the second working mode may be a working mode that allows the external device to access partial non-critical data. The electronic device may further include a third working mode where the third working mode a working mode that does not allow the external device to access any data. For example, the first port may need to be inserted into 3 second ports in a predetermined sequence to prevent unauthorized users from stealing data from electronic devices.

Further, the external device's first working mode may be a working mode that allows the electronic device to access data in the external device, and the second working mode may be a working mode that does not allow the electronic device to access data in the external device. The electronic device may only access data in the external device when the first port and the second port are connected in the first connection relationship to prevent illegal access of data from the external device.

In one embodiment, the external device may be a storage device, the electronic device's first working mode may be a mode with a first write access, and its second working mode may be a mode with a second write access. For example, the first working mode may be a working mode that allows the external device to write data, and the second working mode may be a working mode that does not allow the external device to write data. The external device may only write data into the electronic device when the first port and the second port are connected in the first connection relationship to prevent the electronic device when from virus attacks.

In one embodiment, the external device's first working mode may be a working mode that allows the electronic device to write data into the external device, and its second working mode may be a working mode that does not allow the electronic device to write data into the external device. The electronic device may only write data into the external device when the first port and the second port are connected in the first connection relationship to prevent the external device when from virus attacks.

In one embodiment, when the electronic device or external device is under the second working mode and the connection relationship matches the first connection relationship, upon receiving a second mode switch instruction to switch the electronic device or external device from the second working mode to the first working mode, the electronic device or the external device may respond to the second mode switch instruction. Further, when the electronic device or external device is under the first working mode and the connection relationship matches the second connection relationship, upon receiving a first mode switch instruction to switch the external device or electronic device from the first working mode to the second working mode, the electronic device or the external device may respond to the second mode switch instruction.

That is, when the electronic device or the external device is under the second working mode, the connection relationship of the electronic device or the external device may switch from the second connection relationship to the first connection relationship, and the electronic device or the external may switch from the second working mode to the first working mode based on the second mode switch instruction. Further, when the electronic device or the external device is under the first working mode, the connection relationship of the electronic device or the external device may switch from the first connection relationship to the second connection relationship, and the electronic device or the external may switch from the first working mode to the second working mode based on the first mode switch instruction.

In one embodiment, upon receiving a first mode switch instruction to switch the external device or electronic device from the first working mode to the second working mode, and the connection relationship matches the first connection relationship, the electronic device or the external device may respond to the first mode switch instruction. Further, upon receiving a second mode switch instruction to switch the external device or electronic device from the second working mode to the first working mode, and the connection relationship matches the second connection relationship, the electronic device or the external device may respond to the second mode switch instruction.

For example, the external device may be a display device, the first connection relationship may correspond to a first image output mode, and the second connection relationship may correspond to a second image output mode. While the external device and the electronic device are under the first connection relationship, video files may be transmitted through the external device and the electronic device. Upon the completion of the output of the video files, when text files need to be transmitted, the second mode switch instruction may be used to switch the working mode. Further, while the external device and the electronic device are under the second connection relationship, text files may be transmitted through the external device and the electronic device. Upon the completion of the output of the text files, when video files need to be transmitted, the first mode switch instruction may be used to switch the working mode.

In one embodiment, while the connection relationship is the first connection relationship, and the first port and the second port are connected in the first connection relationship, when a first request is received to place the electronic device or the external device under the first working mode with adjusted parameters, the parameters in the first working mode may be adjusted based on the first request. Upon completing the data output corresponding to the first request, the parameters adjusted under the first working mode may be adjusted to the original parameters.

In one embodiment, the electronic device or the external device may respond to a first command that may be identified based on the first connection relationship when the first port and the second port are connected in the first connection relationship. When the first port and second are in connection relationships other than the first connection relationship, the connection relationships other than the first connection relationship may correspond to invalid control commands or have no corresponding control commands, the connection relationships other than the first connection relationship may be invalid connections, and do not need to be responded.

In one embodiment, identifying a connection relationship from two or more candidate connection relationships between the first port and the second port may be based on a one-time plug connect between the first port and the second port, or a sequence of a plurality of connections within a timeframe between the first port and the second port.

In one embodiment, the two or more candidate connection relationships may include a one-time plug connect between the first port and the second port. For example, the first port and the second port only need to connect once to establish the connection relationship, and the working mode may be identified based on the established connection relationship.

In one embodiment, the two or more candidate connection relationships may include a sequence of connection relationships obtained from a plurality of connections within a timeframe between the first port and the second port. For example, the first port and the second port may connect two or more times within a timeframe, the first connect may be a first connection relationship, the second connect may be a second connection relationship, the third connect may be a third connection relationship, and no more subsequent change in connection relationship afterward. Accordingly, the connection sequence obtained may be the first connection relationship→the second connection relationship→the first connection relationship. Different connection sequences may correspond to different control commands; hence correspond to different working modes.

In one embodiment, the plurality of connections within a timeframe may be completing all the connections within the timeframe. Further, identification of the connection relationship sequence may be based on a time interval between 2 connections. When the connection relationship does not change in the time interval, the sequence may be considered complete.

Furthermore, the plurality of connections within a timeframe may be that the first port and the second port need to complete two or more connections within the timeframe in sequence. For example, the second port may include a first second-port, a second second-port, and a third second-port. The first port may connect to the first, second, and third second-port, and connect to the last second port within the timeframe to correspond to a first working mode.

In one embodiment, identifying a connection relationship from two or more candidate connection relationships between the first port and the second port may include identifying a resistance level at the plug connect between the first port and the second port, and identifying the connection relationship from two or more candidate connection relationships based on the resistance level.

The first port and the second port may have two or more candidate connection relationships, and different candidate connection relationships may be identified based on the resistance level at the plug connect between the first port and the second port. That is, the corresponding candidate connection relationship may be identified based on different resistance levels at the plug connect between the first port and the second port that may be connected at different angles or different depths.

For example, the first port may be a Type C plug, the second port may be a Type C slot, and the resistance level at the plug connect between the first port and the second port may be different depending on whether the connection is achieved through forward insertion or reverse insertion.

Further, the connection relationship may be identified from two or more candidate connection relationships based on the relative location of the plug connect between the first port and the second port. Different relative connection positions may correspond to different connection relationships, hence, different control commands.

For example, a plurality of sensors may be placed by the connection of the second port, and data from different number of sensors may correspond to different connection relationships, or data from the plurality of sensors in different positions may correspond to different connection relationships.

The embodiments of the electronic device described above may identify a connection relationship from two or more candidate connection relationships between a first port of an external device and a second port of an electronic device in response to a processor detecting a plug connect between the first port and the second port; identify a plurality of control commands corresponding to the connection relationship; and respond to the control commands. The identification of connection relationship between the external device and the electronic device, and the control commands corresponding to the connection relationship avoids the need of additional software controls to enhance the functionalities of the external device, thereby simplifying the user operation and enhancing user experience of the external device or the electronic device under various working modes.

Figure 5:
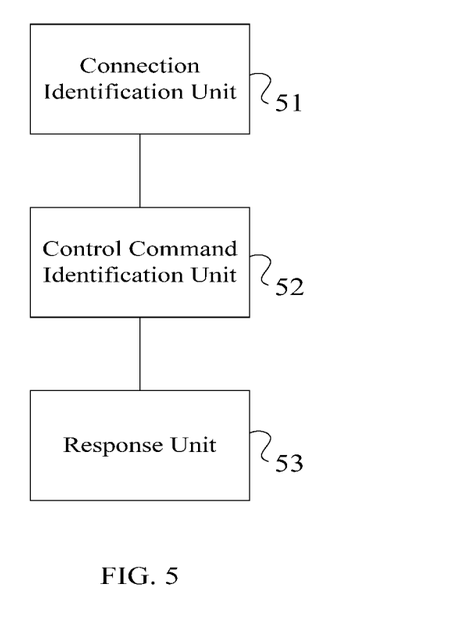
FIG. 5 is a block diagram illustrating the structure of a processing apparatus according to an embodiment of the present disclosure.

FIG. 5 is a block diagram illustrating the structure of a processing apparatus according to an embodiment of the present disclosure. The processing apparatus includes a connection identification unit 51, a control command identification unit 52, and a response unit 53.

The connection identification unit 51 may be used to identify a connection relationship, from two or more candidate connection relationships, that matches a plug connect between the first port and the electronic device port, in response to detecting a plug connect between the first port and the second port.

The control command identification unit 52 may be used to identify a plurality of control commands corresponding to the connection relationship based on the connection relationship. Further, each candidate connection relationship corresponds to a different control command.

The response unit 53 may be used to respond to the control command.

The processing apparatus disclosed in the above embodiments is based on the processing method and the electronic device disclosed in the foregoing embodiments, and the details will not be described here.

The embodiments of the electronic device described above may identify a connection relationship, from two or more candidate connection relationships, that matches a plug connect between the first port and the electronic device port, in response to detecting a plug connect between the first port and the second port; identify a plurality of control commands corresponding to the connection relationship; and respond to the control commands. The identification of connection relationship between the external device and the electronic device, and the control commands corresponding to the connection relationship avoids the need of additional software controls to enhance the functionalities of the external device, thereby simplifying the user operation and enhancing user experience of the external device or the electronic device under various working modes.

The embodiments in this specification are described in a progressive manner, each embodiment emphasizes a difference from the other embodiments, and the identical or similar parts between the embodiments may be made reference to each other. Since the apparatuses disclosed in the embodiments are corresponding to the methods disclosed in the embodiments, the description of the apparatuses is simple and relevant parts may be made with reference to the description of the methods.

Persons skilled in the art may further realize that, units and steps of algorithms according to the description of the embodiments disclosed by the present disclosure can be implemented by electronic hardware, computer software, or a combination of the two. In order to describe interchangeability of hardware and software clearly, compositions and steps of the embodiments are generally described according to functions in the forgoing description. Whether these functions are executed by hardware or software depends upon specific applications and design constraints of the technical solutions. Persons skilled in the art may use different methods for each specific application to implement the described functions, and such implementation should not be construed as a departure from the scope of the present disclosure.

The steps of the methods or algorithms described in the embodiments of the present disclosure may be directly implemented by hardware, software modules executed by the processor, or a combination of both. The software module can be placed in a random access memory (RAM), memory, read only memory (ROM), electrically programmable ROM, electrically erasable and programmable ROM, register, hard disk, mobile disk, CD-ROM, or any other form of storage medium known to the technical domain.

It will be understood by those skilled in the art that the features described in the respective embodiments and/or claims of the present disclosure can be combined in various ways, even when such combinations are not explicitly described in the present disclosure. In particular, without departing from the spirit and teaching of the present disclosure, the features described in the respective embodiments and/or claims can be combined in various ways. All of these combinations fall within the scope of the present disclosure.

While the present disclosure has been shown and described with reference to various embodiments thereof, it will be understood by those skilled in the art that various modifications in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

It should be noted that the description of the foregoing embodiments of the electronic device may be similar to that of the foregoing method embodiments, and the device embodiments have the same beneficial effects as those of the method embodiments. Therefore, details may not be described herein again. For technical details not disclosed in the embodiments of the electronic device of the present disclosure, those skilled in the art may understand according to the method embodiments of the present disclosure.

In the several embodiments provided in the present disclosure, it should be understood that the disclosed device and method may be realized in other manners. The device embodiments described above are merely exemplary. All functional modules or units in the embodiments of the present disclosure may all be integrated in one processing unit, or each unit may be used as a single unit. Two or more units may be integrated in one. The above integrated unit can either be implemented in the form of hardware, or in the form of hardware combined with software functional units.

Persons of ordinary skill in the art should understand that, all or a part of steps of implementing the foregoing method embodiments may be implemented by related hardware of an computer instruction program. The instruction program may be stored in a computer-readable storage medium, and when executed, a processor executes the steps of the above method embodiments as stated above. The foregoing storage medium may include various types of storage media, such as a removable storage device, a read only memory (ROM), a random-access memory (RAM), a magnetic disk, or any media that stores program code.

Alternatively, when the above-mentioned integrated units of the present disclosure are implemented in the form of a software functional module being sold or used as an independent product, the integrated unit may also be stored in a computer-readable storage medium. Based on this understanding, the technical solutions provided by the embodiments of the present disclosure essentially or partially may be embodied in the form of a software product stored in a storage medium. The storage medium stores instructions which are executed by a computer device (which may be a personal computer, a server, a network device, or the like) to realize all or a part of the embodiments of the present disclosure. The above-mentioned storage medium may include various media capable of storing program codes, such as a removable storage device, a read only memory (ROM), a random-access memory (RAM), a magnetic disk, or an optical disk.

Logic when implemented in software, can be written in an appropriate language such as but not limited to C# or C++, and can be stored on or transmitted through a computer-readable storage medium (e.g., that is not a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

As disclosed, the present disclosure provides a processing method and processing apparatus, and an electronic device. The method includes identifying a connection relationship, from two or more candidate connection relationships, that matches a plug connect between a first port of an external device and a second port of an electronic device, in response to detecting a plug connect between the first port and the second port; based on the connection relationship, identifying a control command corresponding to the connection relationship, each candidate connection relationship corresponding to a different control command; and responding to the control command. The identifications of connection relationship between the external device and the electronic device, and the control commands corresponding to the connection relationship avoid the need of additional software controls to enhance the functionalities of the external device, thereby simplifying the user operation and enhancing user experience of the external device and the electronic device under various working modes.

The foregoing descriptions are merely embodiments of the present disclosure, and the protection scope of the present disclosure is not limited thereto. The scope that anyone skilled in the art may easily conceive changes and substitutions within the technical scope disclosed in the present disclosure that should be covered by the present disclosure. Therefore, the protection scope of the present disclosure should be subject to the scope of the claims as listed in the following.

Other embodiments of the disclosure will be apparent to those skilled in the art from consideration of the specification and practice of the disclosure provided herein. It is intended that the specification and examples be considered as exemplary only, with a true scope and spirit of the disclosure being indicated by the claims.

What is claimed is:

1. A processing method, comprising:
   in response to detecting a plug connect between a first port of an external device and a second port of an electronic device, identifying, from two or more candidate connection relationships between the first port and the second port, a connection relationship that matches the plug connect based on a plurality of connection parameters, wherein the plurality of connection parameters characterize a depth of the plug connect;
   based on the connection relationship, identifying a control command corresponding to the connection relationship, wherein each candidate connection relationship corresponds to a different control command; and
   responding to the control command.

2. The method according to claim 1, wherein identifying the control command corresponding to the connection relationship further includes:
   identifying a first control command when the connection relationship is a first connection relationship of the two or more candidate connection relationships, wherein the first control command is used to place the external device or the electronic device under a first working mode; and
   identifying a second control command when the connection relationship is a second connection relationship of the two or more candidate connection relationships, wherein the second control command is used to place the external device or the electronic device under a second working mode.

3. The method according to claim 1, wherein identifying the connection relationship comprises:
   identifying the connection relationship from the two or more candidate connection relationships after one-time plug connect between the first port and the second port.

4. The method according to claim 1, wherein the plurality of connection parameters further characterize an angle or a position of the plug connect between the first port and the second port.

5. The method according to claim 1, wherein:
   the plurality of connection parameters further characterize a resistance level at the plug connect between the first port and the second port.

6. The method according to claim 1, wherein:
   the second port is capable of being plug connected at a plurality of different relative locations,
   identifying the connection relationship further includes:
      identifying, from the plurality of different relative locations, a relative location of the plug connect between the first port and the second port; and
      identifying, from the two or more candidate connection relationships, the connection relationship further based on the relative location.

7. The method according to claim 2, further comprising:
   in response to the external device or the electronic device being under the second working mode and the connection relationship being the first connection relationship, receiving a first mode switch instruction to switch the external device or the electronic device from the second working mode to the first working mode; and responding to the first mode switch instruction; or in response to the external device or the electronic device being under the first working mode and the connection relationship being the second connection relationship, receiving a second mode switch instruction to switch the external device or the electronic device from the first working mode to the second working mode; and responding to the second mode switch instruction.

8. The method of claim 2, wherein:
the external device is a multimedia acquisition device, the first working mode is a first acquisition mode, and the second working mode is a second acquisition mode.

9. An electronic device, comprising:
an electronic device port capable of connecting to a first port on an external device; and
a processor, configured to:
    in response to detecting a plug connect between the first port of the external device and the electronic device port of an electronic device, identify, from two or more candidate connection relationships between the first port and the electronic device port, a connection relationship that matches the plug connect based on a plurality of connection parameters, wherein the plurality of connection parameters characterize a depth of the plug connect;
    identify a control command corresponding to the connection relationship, each candidate connection relationship corresponding to a different control command; and
    respond to the control command.

10. A processing apparatus, comprising:
at least one processor, configured to:
    in response to detecting a plug connect between a first port of an external device and a second port of an electronic device, identify, from two or more candidate connection relationships between the first port and the second port, a connection relationship that matches the plug connect based on a plurality of connection parameters, wherein the plurality of connection parameters characterize a depth of the plug connect;
    identify a control command corresponding to the connection relationship, each candidate connection relationship corresponding to a different control command; and
    respond to the control command.

11. The method according to claim 1, wherein identifying the connection relationship comprises:
identifying a sequence of a plurality of connection relationships after a plurality of plug connects within a pre-set timeframe between the first port and the second port.

12. The method according to claim 2, wherein:
the external device is a multimedia output device, the first working mode is a first output mode, and the second working mode is a second output mode.

13. The method according to claim 2, wherein:
the external device is a storage device, the first working mode is a mode having a first read access, and the second working mode is a mode having a second read access.

14. The method according to claim 2, wherein:
the external device is a storage device, the first working mode is a mode having a first write access, and the second working mode is a mode having a second write access.

15. The method according to claim 2, wherein:
the external device is a power source configured to charge the electronic device, the first working mode is a mode having a first charging speed, and the second working mode is a mode having a second charging speed.

16. The method according to claim 2, wherein:
the external device is a data cable, the first working mode is a charging mode, and the second working mode is a data transmission mode.

17. The method according to claim 16, wherein:
the electronic device includes a monitor;
a brightness of the monitor is maintained in the first working mode; and
the monitor is turned off in the second working mode.

* * * * *